Dec. 4, 1962 M. GERTEL 3,066,905
VIBRATION ISOLATOR
Filed Feb. 26, 1960 5 Sheets-Sheet 1

INVENTOR.
MAURICE GERTEL
BY
Kenway, Jenney, Witter & Hildreth
ATTORNEYS

Dec. 4, 1962         M. GERTEL          3,066,905
                  VIBRATION ISOLATOR
Filed Feb. 26, 1960                5 Sheets-Sheet 2

INVENTOR.
MAURICE GERTEL
BY
Kenway, Jenney, Witter & Hildreth
ATTORNEYS

Dec. 4, 1962
M. GERTEL
3,066,905
VIBRATION ISOLATOR
Filed Feb. 26, 1960
5 Sheets-Sheet 4
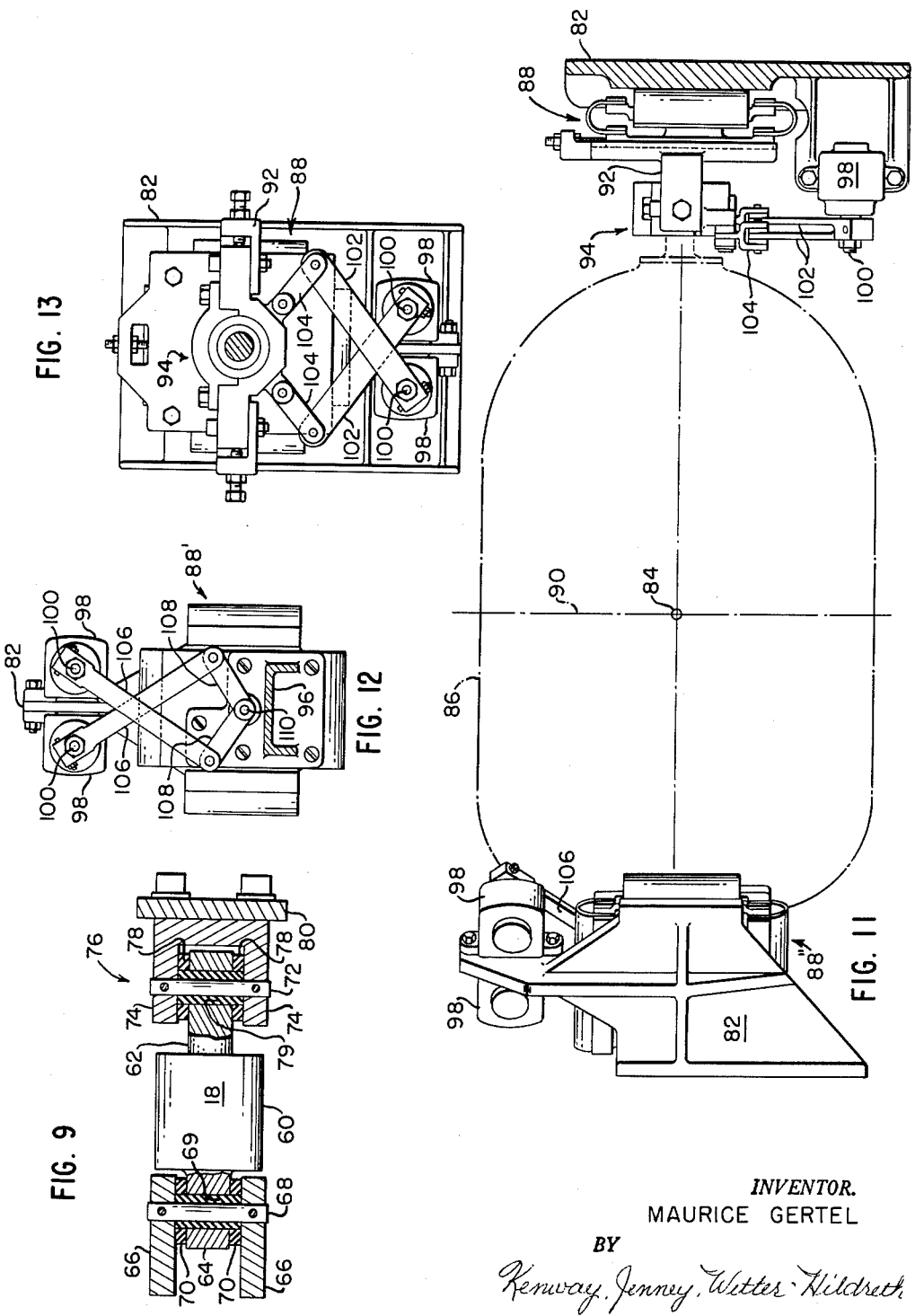
INVENTOR.
MAURICE GERTEL
BY
Kenway, Jenney, Witter, Hildreth
ATTORNEYS

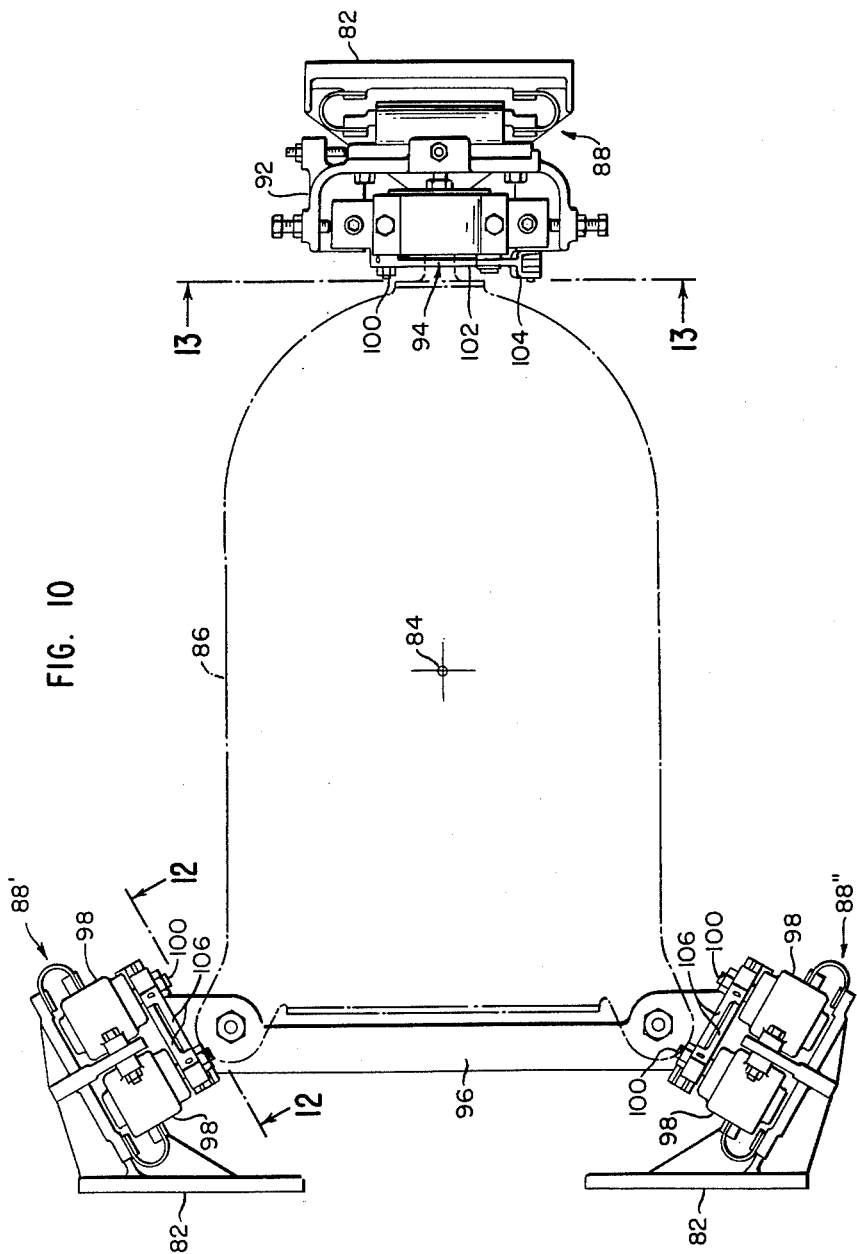

United States Patent Office 3,066,905
Patented Dec. 4, 1962

3,066,905
VIBRATION ISOLATOR
Maurice Gertel, Chestnut Hill, Mass., assignor, by mesne assignments, to Allied Research Associates, Inc., Boston, Mass., a corporation of Delaware
Filed Feb. 26, 1960, Ser. No. 11,346
5 Claims. (Cl. 248—358)

This invention relates to vibration isolation systems generally and, more particularly, to a novel and improved vibration isolator which is particularly suitable for use with navigational instruments and the like.

Vibration isolators are used to reduce the magnitude of vibratory forces transmitted from one member or element to another member or element. It may be desired to reduce the magnitude of forces transmitted from a supported element to its supporting structure or vice versa. While not necessarily limited thereto, this invention is concerned with reducing the magnitude of vibratory forces transmitted from a supporting structure to a supported device. Also, while not limited thereto, this invention is concerned with the support of devices such as navigational instruments and the like where it is desirable, if not necessary, to provide vibration isolation of the supported device with respect to the usual three coordinates of translational vibration as well as to provide for resilient restraint against movement by and isolation from angular vibration. The problem of angular vibration also includes the problem of returning the supported device to the initial position it held prior to displacement thereof, with a high degree of accuracy.

It is an object of this invention to provide a novel and improved vibration isolator assembly for isolation of a supported device from the usual three coordinates of translational vibration and from angular vibration.

It is another object of this invention to provide a novel and improved vibration isolating system of the type described which will have improved returnability following angular displacement thereof.

It is another object of this invention to provide a novel and improved vibration isolating system of the type described by which there may be provided predetermined varying degrees of stiffness with respect to and between the degrees of translational and angular freedom of movement of the supported device.

It is another object of the present invention to provide novel and improved spring suspension for a vibration isolating system of the type described which will provide the support for a mass which it is desired to isolate, with the suspension also providing the vibration isolation of the device; which will provide a greater stiffness or restraint against movement of a supported mass in one or more directions of movement of the mass as compared to one or more other directions of movement; which will provide a large supporting force and a relatively large amount of translational deflection while at the same time will be of relatively small size; and which may be adapted to have a relatively large inherent damping characteristic or to have a negligible damping and a low hysteresis characteristic.

It is a further object of this invention to provide a spring supported vibratory isolation system utilizing a novel and improved arrangement of damper elements having significantly large inherent friction to provide an isolation system having a high degree of accuracy of returnability of a supported device following angular displacement of the device from an initial position, notwithstanding the inherent friction of the damper elements.

Other objects will be in part obvious and in part pointed out in more detail hereinafter.

In one aspect, my invention contemplates the support and isolation of a mass, which might be a navigational instrument or device, by means of a plurality of angularly spaced apart suspension elements. Each of these suspension elements comprises a plurality of supporting and isolating elements which will be hereinafter referred to as C-springs. By a C-spring is meant a generally channel-shaped member having a resiliently deformable web portion which in cross section is redirected in the sense of a C-shape, W-shape, V-shape, Z-shape, etc., cross section, or in the sense of cross sections such as are often referred to as sinuous or corrugated cross sections. The characterizing feature of a C-spring, for the purpose of this invention, is that it is resiliently flexible in a cross sectional plane both in a first direction, wherein the web portion tends to be compressed or elongated, and a second direction extending at right angles to the first direction, wherein the web is skewed so that the opposite ends of the web tend to be laterally offset from each other, and is at least substantially stiffer, if not substantially rigid, in the direction extending at right angles to the cross sectional plane of the C-spring. In each suspension element there are at least two C-springs which are angularly offset so that the cross sectional plane of one C-spring extends at right angles to the cross sectional plane of the other C-spring. One of the ends of each of the C-springs is rigidly connected to one of the ends of the other C-spring so that the two springs are arranged in series relation. The other end of one of the C-springs is rigidly connected to means for mounting the mass to be supported and isolated, and this end of the series arranged C-springs in each of the angularly spaced apart suspension elements is rigidly connected to the corresponding ends of the other series arranged C-springs in the remaining suspension elements. The other end of the other C-spring in each series arranged pair thereof is rigidly connected to a common base or supporting structure.

The C-springs or suspension elements provide the sole resilient support of the mass being isolated as well as provide the vibratory isolation of the mass. The suspension elements are preferably arranged relative to the mass being supported to provide a decoupled isolation system. By a decoupled isolation system is meant a vibratory isolation system wherein the elastic center of the system coincides with the center of gravity of the mass being supported. By the term elastic center is meant the point in a system of spring supports to which a linear force may be applied from any direction with a resulting purely translational movement of the mass supporting structure of the system. Thus, in a decoupled isolation system a linear force exerted on the center of gravity of the supported mass from any direction will result in a pure translational movement of the mass with no angular component of movement. When a C-spring isolation system of the type described is used to support a mass such as a navigational device having an azimuth axis, the suspension elements are preferably arranged relative to the azimuth axis of the system and the center of gravity of the mass being supported and are constructed to provide a decoupled system. While linear forces on the supported device will tend to result in pure translational movement of the device, a rotational input force applied to the device will, of course, tend to provide angular movement of the device either about its azimuth axis or about an axis extending at right angles thereto, which will be referred to as a tilt axis. The tilt axis may correspond to one of the axes generally referred to as the pitch and roll axes, or an axis spaced angularly between the pitch and roll axes. By arranging the suspension elements in a predetermined relation with respect to the azimuth axis, so as to arrange the series connected C-springs in either parallel or perpendicular relation with respect to the azimuth axis or inclined relative to the azimuth axis, the system may be provided with significantly increased stiffness with respect to movement of the device about a selected one of the azimuth or tilt axes or with respect to both the azimuth and a tilt axis. This increased stiffness may be particularly desirable in the case of a navigational device, where it is desired to provide as little movement of the device as possible about either or both the azimuth and/or the tilt axes. In the case of a navigational device, it may also be desirable to assure that following angular displacement of the device about either the azimuth axis or a tilt axis the device will be returned by the suspension elements to its initial position with a high degree of accuracy.

It is necessary, of course, that the C-springs provide sufficient stiffness to provide a satisfactory resilient support of the device. Also, it may be desirable to provide for displacements of the mass which are relatively large as compared to the stiffness of the C-spring. Also, it is desirable to provide a C-spring of relatively small dimensions in order to conserve space. Further, it is desirable to provide damping in the system, and in this connection, and in the interest of economy and simplicity of construction, it may be desirable to use a thrust-type friction damper which is connected between the mass and the base or supporting structure. In order to provide a C-spring with the combined features of relatively high stiffness, the ability to operate with relatively large vibratory displacements, and small size, I provide the C-springs in a laminated configuration, wherein each spring comprises a plurality of nested C-spring members. In order to obtain the accurate returnability desired, at least the deformable portions of the C-spring members making up each laminated C-spring are spaced apart to eliminate rubbing contact between the deformable portions of the C-spring members during deformation of the suspension elements. In this manner any hysteresis effect due to interfacial friction forces resulting from rubbing contact of the C-spring members is eliminated, and a higher degree of angular returnability of the system is provided. Where thrust-type friction dampers are utilized to provide system damping, the dampers are preferably focused at the elastic center of the system. This focusing of dampers, having a significant inherent friction, at the elastic center of a decoupled vibratory isolation system eliminates rotational hysteresis effects in the system due to the friction in the dampers and thus eliminates any reduction in the accuracy in the angular returnability of the system due to the friction in the dampers. A more detailed understanding of this as well as other aspects of this invention may be obtained by reference to the following detailed description when taken in connection with the accompanying drawings, in which:

FIG. 9 is an enlarged cross sectional view substantially along the line 9—9 of FIG. 2;

FIG. 10 is a plan view of an alternative embodiment of a vibration isolator assembly constructed in accordance with this invention;

FIG. 11 is a side elevational view, partly in section, of the vibration isolator assembly of FIG. 10;

FIG. 12 is a sectional view substantially along the line 12—12 of FIG. 10; and

FIG. 13 is a sectional view substantially along the line 13—13 of FIG. 10.

Figure 1:
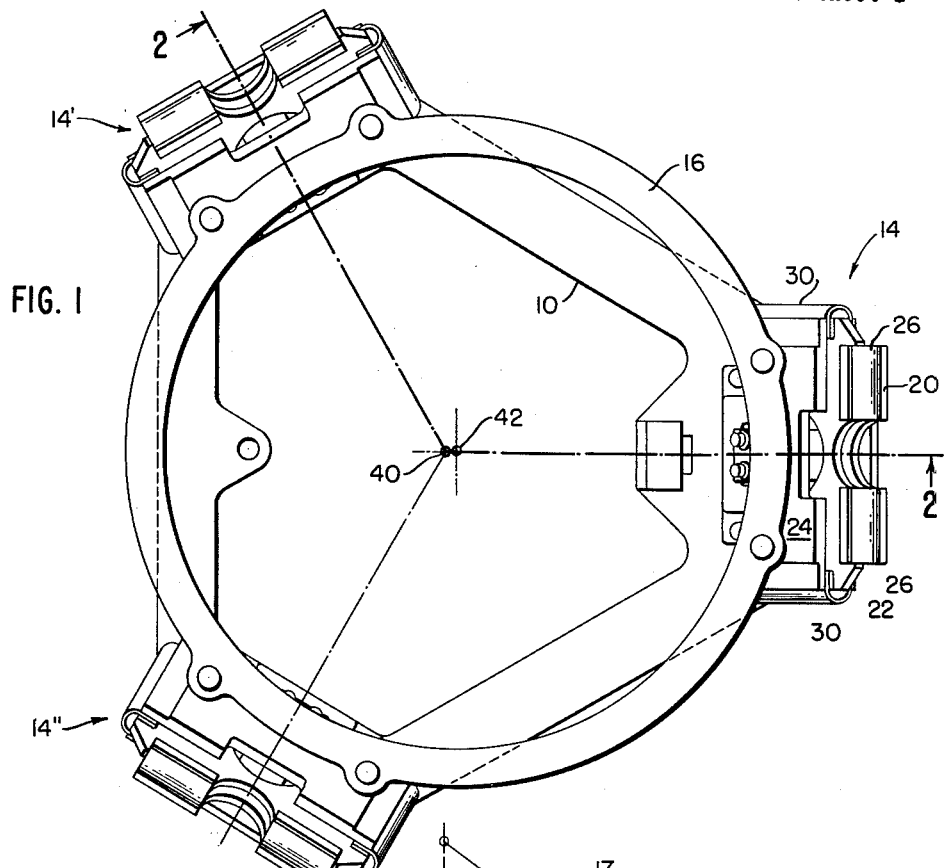
FIG. 1 is a plan view of a vibration isolator assembly constructed in accordance with this invention.
Figure 2:
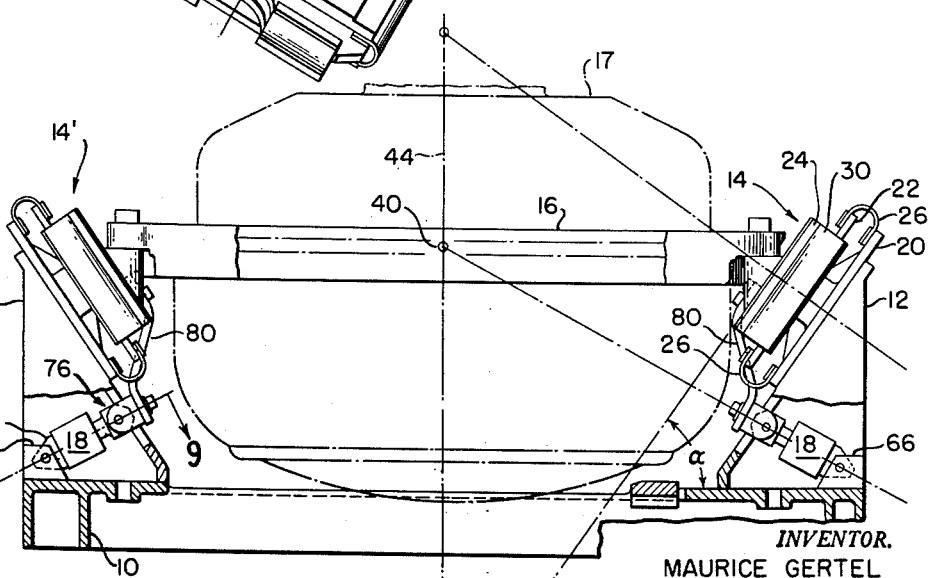
FIG. 2 is a cross sectional view substantially along the line 2—2 of FIG. 1.

With reference to the drawings, and particularly FIGS. 1 and 2, a preferred embodiment of an isolating assembly constructed in accordance with the present invention comprises a base or supporting structure 10 on which are mounted a plurality of angularly spaced apart brackets 12, which mount spring suspension elements generally indicated at 14, 14′, and 14″. The spring suspension elements are each connected to a supporting ring or member 16 which in turn is adapted to support the mass to be isolated. This mass may be a navigational instrument or the like 17 such as indicated in broken lines in FIG. 2. The spring suspension elements provide the sole support of the mass being isolated and also provide the isolation of the mass from vibration. In order to provide damping for the system, a plurality of dampers 18 corresponding in number to and respectively associated with the spring suspension elements are connected between the base 10 and a portion of one of the spring suspension elements which is rigidly connected to the supporting ring 16.

Figure 3:
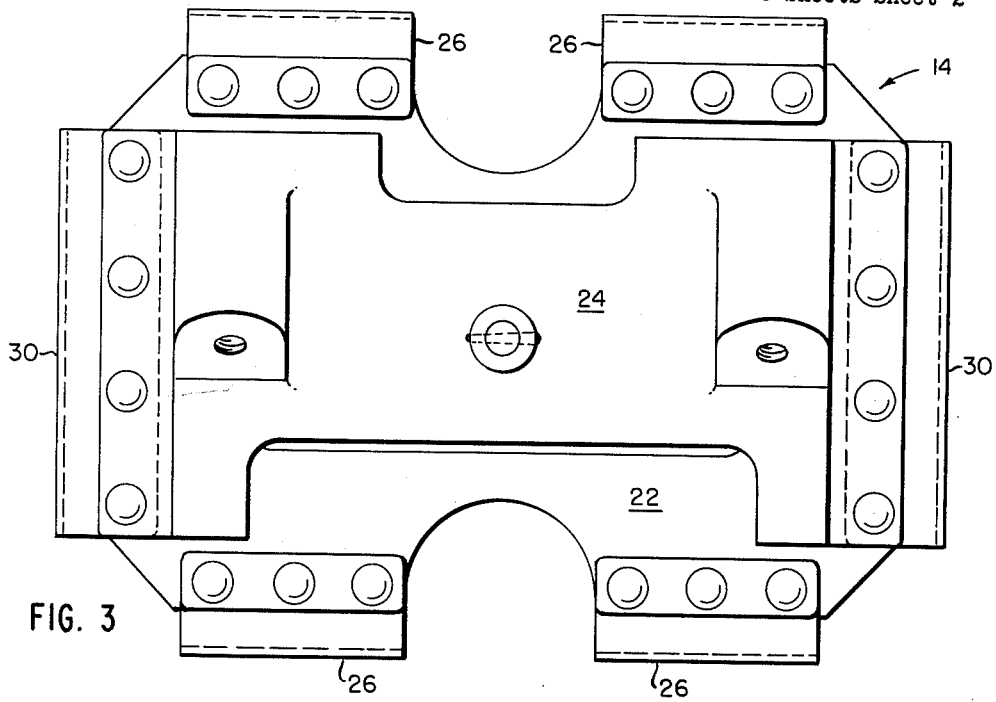
FIG. 3 is an enlarged top plan view of one of the spring suspension elements of the isolator of FIG. 1.
Figure 4:
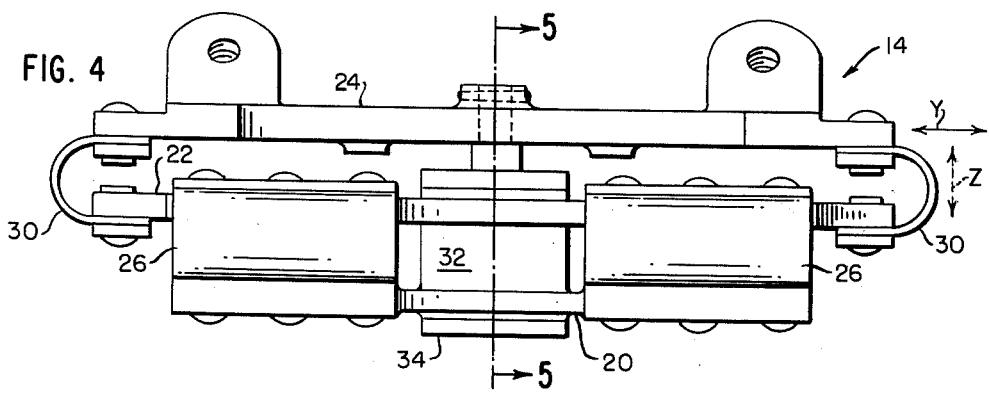
FIG. 4 is a side elevational view of the spring suspension element of FIG. 3.
Figure 5:
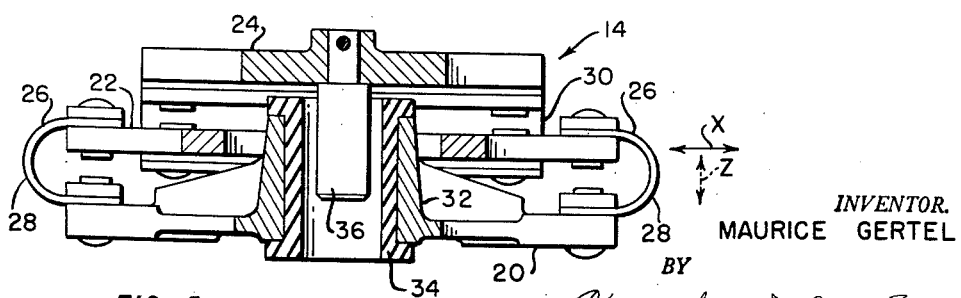
FIG. 5 is a cross sectional view substantially along the line 5—5 of FIG. 4.

In the preferred embodiment of FIGS. 1 and 2, each of the spring suspension elements is identical in construction, and accordingly, in the interest of brevity, only the element 14 will be described in detail. With reference to FIGS. 3 to 5, the suspension element 14 comprises a plurality of stacked parallel platelike members 20, 22 and 24. The bottom plate 20 and intermediate plate 22 are resiliently connected by a set of parallel spaced apart C-springs including a pair of elongated longitudinally aligned and spaced apart C-shaped C-springs 26 extending along the longitudinal edges of the plates. In the embodiment of FIGS. 3 to 5, the bight or web portion 28 of each spring 26 is shown as being disposed outwardly of the longitudinal edges of the plates 20 and 22, although, as will be apparent, if desired, the bight portion of the springs might be disposed between the plates and inside the longitudinal edges thereof. With the connection of the plates 20 and 22 at their longitudinal edges by oppositely facing C-springs, as shown in FIGS. 3 to 5, it will be apparent that with the plate 20 fixed to its associated bracket 12 the intermediate plate 22 will be permitted movement toward and away from the plate 20 in the direction of the dotted line arrow of FIG. 5, wherein the connecting web or bight portion 28 of the C-spring 26 will tend to the compressed or elongated. More specifically, during movement of the plate 22 toward the plate 20 the cross sectional configuration of the bight 28 of the C-spring 26 will be deformed from the generally semi-cylindrical configuration shown in FIG. 5 to a generally semi-ellipsoid configuration. Also, the plate 22 will be permitted movement in a direction parallel to the general plane of the plate 20 and in a direction generally laterally of the C-springs 26, whereby the opposite ends of the bight portions 28 of the springs 26 will be offset laterally of the springs or, in other words, will assume a generally skewed relation. On the other hand, as will be apparent from the drawings, the springs 26 provide substantially greater stiffness, if not substantial rigidity, with respect to movement of the plate 22 in a direction parallel to the general plane of the plate 20 and longitudinally of the spring. Also, as will be apparent from the drawings, the springs 26 provide substantially increased stiffness, if not substantial rigidity, with respect to angular movement of the plate 22 in the general plane of the plate and relative to the plate 20. The movements of the plate 22 relative to the plate 20 may be related to the usual three coordinates of translational motion; for example, the lateral movement of the plate 22 in the direction of the solid line arrow of FIG.

5 may be referred to as motion along the X axis, while the movement of the plate 22 in the direction of the dotted line arrow may be referred to as motion along the Z axis. Accordingly, it can also be said that the spring 26 provides substantially increased stiffness to motion of the plate 22 along the Y axis, and also provide substantially increased resistance to angular movement of the plate 22 about the Z axis.

The intermediate plate 22 is also connected to the top plate 24 by a set of parallel spaced apart C-springs including a pair of oppositely facing elongated C-shaped C-springs 30 generally similar in cross sectional configuration to the C-springs 26 previously described. The springs 30 extend along the end edges of the plates 22 and 24, and their legs are respectively rigidly connected to the plates. As should be apparent from FIGS. 3 and 4, the arrangement and mounting of the C-springs 30 permit relative movement of the plates toward and away from each other in the direction of the dotted line arrow of FIG. 4 or in other words along the Z axis. Also, the plates 22 and 24 are permitted relative movement in a direction parallel to the general plane of the plates and generally laterally of the C-spring 30 in the direction of the solid line arrow of FIG. 4, which, with respect to the solid line arrow of FIG. 5, corresponds to the Y axis. Also, as will be apparent, the C-springs 30 provide substantially increased stiffness with respect to relative movement of the plates 22 and 24 in a direction generally longitudinally of the springs 30 or along the X axis and also provide substantially increased stiffness, if not substantial rigidity, with respect to angular movement of the plate 24 about the Z axis.

Thus, each suspension element comprises a first set of parallel spaced apart C-springs and a second set of parallel spaced apart C-springs longitudinally extending in a general plane parallel to the general plane of the first set and arranged at right angles to the first set. The sets of C-springs are connected in series relation with the free ends of the sets being respectively connected to the base 10 and mass 17. From the above it can be seen that with the bottom plate 20 rigidly mounted on its mounting bracket 12 the top plate 24 will be permitted resiliently restrained translational movement in all directions within the general plane of the plate and also will be permitted resiliently restrained movement toward and away from the bottom plate 20. On the other hand, the C-springs 26 and 30 will provide substantially increased stiffness with respect to angular movement of the plate 24 relative to the plate 20 and in the general plane of the plate 24. In terms of the three coordinates of translational movement, the plate 24 will be permitted resiliently restrained translational movement along the X, Y and Z axes as well as translational movement in any combination of these axes but will be restrained with a substantially increased stiffness with respect to angular movement of the plate 24 about the Z axis of the suspension element.

In the preferred embodiment of FIGS. 3 to 5, the bottom plate 20 includes a centrally located cylindrical boss 32 in which is received a snubber bushing 34 fabricated of rubber or like material. The top plate 24 carries a snubber post 36 depending from the top plate and extending within the bushing 34 in radially spaced relation thereto. The bushing 34 overlaps the upper end of the boss 32 so as to be engageable with the underside of the top plate 24 to limit movement of the plate 24 toward the plate 20. The post 36 will, of course, limit movement of the plate 24 in the direction parallel to the plate 20.

In the embodiment of FIGS. 1 and 2, it is desired to provide an iso-elastic system. The term iso-elastic is used herein to define a system wherein the system will provide equal stiffness with respect to translational movement of the supported mass along the X, Y and Z axes of the system as a whole. This system is achieved, in part, in the embodiment of FIGS. 1 and 2 by inclining the suspension elements upwardly and outwardly of the base 10 at an angle $\alpha$. The angle $\alpha$, as shown in FIG. 2, may be defined as the angle between the general plane of the top plate 24 of the suspension element or the general plane of the suspension element and the general plane of the base 10. The iso-elastic characteristic of the system is also achieved, in part, by the equiangular spacing of the suspension elements about a line extending vertically through the center of gravity of the supported device and perpendicular to the general plane of the base 10. The center of gravity of the supported device is indicate at 40 in FIG. 2 and may, as shown in FIGS. 1 and 2, be laterally offset from the geometric center of the mounting ring 16, which is shown at 42 in FIG 1. The spring suspension elements are angularly oriented relative to the center of gravity 40 of the supported device so that the Z axes of the suspension elements intersect substantially at a point on the vertical line extending through the center of gravity 40 and perpendicular to the general plane of the base 10. The suspension elements are offset vertically below the center of gravity 40 of the supported device a predetermined amount in order to locate the elastic center substantially at the center of gravity and thus provide a decoupled system. It will, of course, be apparent that the suspension elements could be inclined in the opposite direction so as to extend upwardly and inwardly of the base 10, in which case the suspension elements would be offset vertically above the center of gravity 40 in order to achieve the desired decoupling.

In an iso-elastic decoupied system constructed as thus far described, the linear forces acting on the supported device will tend to result only in pure translational movement of the device and will be met by equal restraint regardless of the direction of such forces. With respect to rotational input forces, for example, directed angularly about the Z axis of the system as a whole, the suspension elements will provide substantially increased restraint or stiffness. The Z axis of the system, in the case of the embodiment of FIGS. 1 and 2, corresponds to the vertical line 44 passing through the center of gravity 40 and may be referred to as the azimuth axis of the system. Increased azimuth stiffness of the system is in part derived from the high stiffness of the suspension elements with respect to angular displacement of the top plate 24 about the Z axis of the suspension element, which, of course, is different from the Z axis of the system as a whole. More specifically, the portion of the azimuth restraint which is attributable to the stiffness of the suspension elements about their Z axes varies with the cosine squared of the angle $\alpha$. Accordingly, the azimuth stiffness of the system will decrease as the angle $\alpha$ is increased. Also, in the embodiment of FIGS. 1 and 2, the stiffness of the system with respect to angular movements of the device about a tilt axis extending perpendicular to the azimuth axis 44 is substantially increased as compared to the restraint against translational movement. The restraint against angular movement of the supported device about a tilt axis varies as the sine squared of the angle $\alpha$ and thus restraint increases as the angle $\alpha$ is increased. Therefore, in the iso-elastic system of FIGS. 1 and 2, wherein the suspension elements are inclined at an acute angle to the base 10, the system will afford substantially increased stiffness with respect to angular movements about either the azimuth axis or the tilt axis as compared to the restraint offered with respect to purely translational movement of the supported device along the X, Y, Z axes of the system. It will, of course, also be apparent that with the suspension elements inclined to provide the iso-elastic feature of the system the stiffness with respect to angular movement about the azimuth axis will not be as great as would be the case where the suspension elements lie in a general plane extending parallel to the general plane of the ring 16 so that the Z axes of the suspension elements are parallel to the azimuth axis of the system. With the suspension elements so oriented, the system stiffness about the Z or azimuth axis will be at its maximum, while the system stiffness about a tilt axis will be at its minimum. Also, as will be apparent, the stiffness of the system with respect to angular movement about a tilt axis will not be as great as will be afforded with the suspension elements arranged to lie in a plane extending parallel to the azimuth axis so that the Z axes of the suspension elements coincide with radii from the azimuth axis. In this orientation of the suspension elements azimuth stiffness of the system will be at its minimum and tilt stiffness at its maximum. It will further be apparent that the inclining of the suspension elements may be defined by an angle $\beta$, which is the angle between the general plane of a suspension element and the azimuth axis 44 of the system, and which angle $\beta$ is the complement of the angle $\alpha$.

Figure 6:
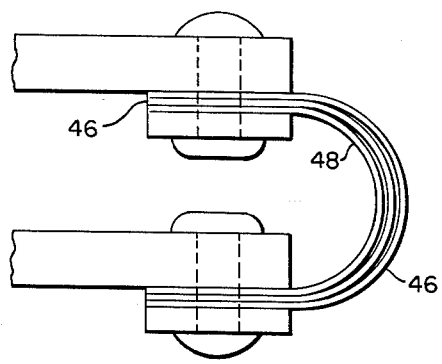
FIG. 6 is an enlarged end view of a preferred configuration of a C-spring for use in the spring suspension element of FIG. 3.

In order to provide suspension elements of the requisite stiffness for the support of the device to be isolated, and which will permit displacements of the device which are relatively large with respect to the stiffness of the suspension elements, and at the same time to provide a suspension element of a relatively small size, the C-springs 26 and 30 of the suspension element are, as shown in FIG. 6, provided in a laminated configuration. More specifically, each C-spring comprises a plurality of nested C-spring members 46. Each of the C-spring members comprises a bight or web portion 48, which in the embodiment of FIG. 6 is generally semi-cylindrical in cross section. Each C-spring member also includes a pair of legs or the like extending from the ends of the bight portions 48 for the mounting of the C-spring elements to the plate members which they connect. In the C-spring embodiment shown in FIG. 6, the bight or web portions 48 of the C-spring elements are spaced apart or gapped so as to substantially reduce, if not prevent, rubbing contact between the bight portions during flexure thereof. For example, in a specific embodiment using C-shaped laminates .004 inch thick, the webs were gapped .002 inch at the apex of their apexes. In this manner, interfacial friction within the C-spring is significantly reduced if not substantially eliminated, and accordingly any hysteresis effect on the system due to such interfacial friction is substantially eliminated. Hysteresis effect of an isolation system refers to the characteristic of the system whereby following displacement of the supported mass from an initial position the mass is returned by the suspension element to a position perhaps slightly displaced from its original position. In the case of a navigational instrument, it may be particularly desirable to reduce this hysteresis effect with respect to angular displacement of the device about its azimuth axis as well as about any tilt axis, such as a roll or pitch axis.

Figure 7:
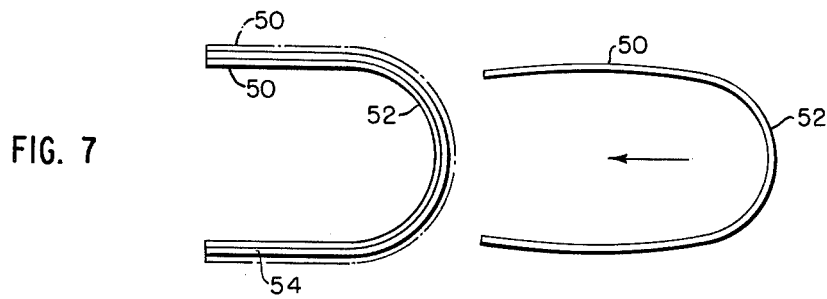
FIG. 7 is an alternative configuration of a C-spring for use in the suspension element of FIG. 3.

In some instances, a reduction in hysteresis effect resulting from friction within the suspension elements 14 may not be as important as providing a relatively high degree of damping within the spring suspension elements. In such an instance, the C-springs may be constructed as shown in FIG. 7, wherein the laminates 50, and particularly the deformable bight or web portions 52 thereof, are in nesting contact with each other. With this construction there will, of course, be a larger amount of interfacial friction between the laminates during deformation of the web portions 52, which interfacial friction may provide a relatively high degree of damping in the system. While the laminates may be nested in mere contact with each other, also, if desired, as shown in FIG. 7, each laminate may be provided with a cross section smaller than that of the next adjacent laminate nested therein. When such laminates are assembled, each outer laminate will firmly and resiliently embrace and grip the next adjacent inner laminate, thus increasing the interfacial friction between the laminates during deformation of the spring. In this connection, it is preferred that the radius of the bight portion of each outer laminate be less than the radius of the bight portion of the next adjacent inner laminate. It is also preferred that each outer laminate be dimensioned so that when it is in its unassembled condition its legs will be spaced apart a distance less than the spacing of the next adjacent inner laminate. With this construction of the C-springs the system damping afforded by the suspension elements may be sufficient to eliminate the need for separate system dampers.

Figure 8:
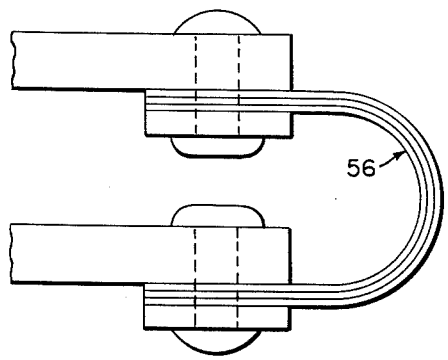
FIG. 8 is a further alternative configuration of a C-spring for use in the suspension element of FIG. 3.

With reference again to FIG. 6, it can be seen that the C-spring is mounted to the respective plates in a manner such that the connecting bight or web portion begins immediately adjacent the edges of the plate. However, as shown in FIG. 8, if desired, the springs, whether incorporating gapped laminates or not, may be positioned relative to the plate so that the bight or web portion 56 is spaced outwardly from the adjacent edges of the plates connected by the spring in order to provide a spring characteristic varying from that of the case where the bight portion begins immediately the edges of the plate. Thus, it will be apparent that the spring characteristics of the suspension system may be modified as desired not only by varying the configuration of the bight or web portion of the spring but also by varying the location of the web portion relative to the plate connected by the C-spring. Also, it should be apparent that while in the specific embodiment of FIGS. 1 to 5 the C-springs are constructed and configured to provide the same stiffness with respect to translation along the X, Y and Z axes of the suspension element, if desired, the characteristics or configuration of the C-springs 26 and 30 of FIG. 3 may be different to provide different characteristics or stiffness with respect to and between the X, Y and Z axes of the suspension element.

Where an isolator constructed in accordance with this invention incorporates C-springs such as shown in FIG. 6, wherein the laminates are gapped, the C-springs will, of course, afford little, if any, damping of the system. Accordingly, damping must be provided separate and distinct from the suspension unit. In the interests of economy of construction as well as simplicity thereof, it is preferred, in the case of the embodiment of FIGS. 1 and 2, to utilize thrust-type friction dampers, which, as shown in FIG. 9, each comprise a housing or cylinder 60 and a reciprocable member or piston 62 received within the cylinder 60 in sliding frictional contact with friction elements carried by the cylinder. As shown in FIGS. 2 and 9, the housing 60 is provided with an axial extension 64 which is pivotally mounted on spaced apart brackets 66 on the base 10. More specifically, a pivot pin 68 carried by the brackets 66 extends through the projection 64 on the housing and pivotally mounts the same. A resilient sleeve 69 is engaged over the pin 78 and a pair of resilient washers 70 are engaged on the pin on opposite sides of the projection 64 and between the projection and the brackets 66. The sleeve 69 and resilient washers 70 permit limited tilting movement of the housing 60 relative to the pin 68 for a purpose later to be described. The piston 62 is pivotally mounted on a pin 72 extending parallel to the pin 68 and carried at its outer ends by a pair of spaced apart members 74 forming a part of a connecting member 76 shown in FIG. 2. A resilient sleeve 79 and a pair of resilient washers 78 are mounted on the pin 72 and are disposed between the piston 62 and spaced apart members 74 to permit a limited amount of tilting movement of the piston relative to the pin 72. The connecting member 76 of which the members 74 form a part is connected by a strap 80 which is, as shown in FIG. 2, rigidly connected to the top plate of the suspension element respectively associated with the damper. Inasmuch as the top plate of the suspension element is rigidly connected to the mounting ring 16, it can be seen that the piston of the damper is also rigidly connected to the ring 16.

In accordance with the invention, the friction dampers are focused at the elastic center of the system. More specifically, in the rest position of the isolating assembly, the line of action or longitudinal axes of the pistons 62 intersect substantially at the elastic center of the system. The provision of the sleeves 69 and 79 and resilient washers 70 and 78 at the pivotal connections at the opposite ends of the damper assures that these connections will not prevent movement of the ring 16 along the X and Y axes or about the Z axis of the system as a whole. While the resilient sleeves 69 and 79 and washers 70 and 78 may offer some restraint against movement of the ring along the X and Y axes and also about the Z axis of the system, the restraint afforded is not significant as compared to the restraint afforded by the suspension elements. Although the arrangement of the dampers has been described above in connection with the specific embodiment shown in FIGS. 1 and 2, it should be apparent that the focusing of any dampers, having significant friction during operation thereof, at the elastic center of a spring supported isolation system will be useful in reducing the rotational hysteresis of the system, or, in other words, improving the angular returnability of the system. Accordingly, this aspect of the invention is not limited to the focusing of thrust-type friction dampers in an iso-elastic decoupled system.

With reference to FIGS. 10 to 13, there is shown an alternative embodiment of a decoupled vibration isolation system constructed in accordance with the present invention. This embodiment comprises a plurality of brackets 82 spaced angularly about the center of gravity 84 of the mass 86 being supported. This embodiment incorporates suspension elements 88 which are constructed generally similarly to the suspension elements 14 previously described. The brackets 82 are rigidly connected to a base or supporting member (not shown) and mount the suspension elements 88 with the suspension elements extending vertically or, in other words, with the top, intermediate, and bottom plates of the suspension elements lying in planes extending parallel to the azimuth axis 90 of the system. Accordingly, it will be apparent that the increased stiffness of the suspension elements about the Z axis of the elements does not contribute to the stiffness of the system as a whole with respect to movement of the device about the azimuth axis. It will further be apparent that the effect of the Z-axis stiffness of the suspension elements on the stiffness of the system with respect to movement of the supported device about a tilt axis is at a maximum when the suspension elements are arranged vertically, as in the embodiment of FIGS. 10 to 13.

The suspension element 88 is connected to the device 86 by means of a yoke 92 rigidly mounted on the top plate of the suspension element 88 and in turn rigidly mounting a connecting structure 94 which rigidly mounts the device 86. The suspension elements 88′ and 88″ are rigidly connected by a tie strap or plate 96 rigidly connected to the top plates of the suspension elements and in turn rigidly mounting the device 86. System damping is provided by a plurality of pairs of rotary viscous dampers 98, with a pair of each of such dampers being respectively associated with each of the suspension elements. In the case of the suspension element 88, the pair of dampers 98 are supported on the bracket 82 vertically below the suspension element, with the shafts 100 of the dampers extending parallel to each other. As clearly shown in FIG. 13, a link 102 is drivingly connected at one end to the shaft 100 of each damper, with the other end of the link 102 being pivotally connected to a link 104, the other end of which is pivotally connected to the connecting member 94 and thus to the top plate of the spring suspension element 88. The links 102 are crossed so that particularly during vertical deflection of the device the links 102 will be moved somewhat in scissors fashion, with movement of each link 102 providing a corresponding movement of the shaft 100 of the associated damper.

In the case of each of the suspension elements 88′ and 88″ the dampers 98 are mounted on the brackets 82 vertically above the suspension elements. As shown in FIG. 12, the damper shafts 100 are each drivingly connected to one end of a link 106, the other end of which is pivotally connected to one end of a link 108. The other ends of the links 108 are pivotally connected to a common pivot 110 extending perpendicular to and fixed relative to the top plate of the suspension element. As should be apparent from FIGS. 10 to 13, the viscous dampers 98 will provide system damping with respect to movement of the device in any direction. Inasmuch as the rotary viscous dampers are preferably of a type which does not have any significant friction factor, it is not necessary, in the embodiment of FIGS. 10 to 13, to focus the dampers at the elastic center of the system.

Although the various aspects of the present invention have been described in terms of the specific embodiments illustrated in the accompanying drawings, it will, of course, be realized that many changes could be made in the above construction and many apparently widely different embodiments of this invention could be made without departing from the scope thereof. It is, therefore, intended that all matter contained in the above description or shown in the accompanying drawings shall be interpreted as illustrative and not in a limiting sense.

It is also to be understood that the language in the following claims is intended to cover all of the general and specific features of the invention herein described and all statements of the scope of the invention which, as a matter of language, might be said to fall therebetween.

I claim:

1. A vibration isolator having an azimuth axis and comprising, a supporting structure, a plurality of suspension elements spaced angularly about said azimuth axis and each comprising a first set of parallel spaced apart C-springs and second set of spaced apart parallel C-springs longitudinally extending at right angles to the first set of C-springs and in a general plane extending parallel to the general plane of the first set of C-springs, means connecting said first and second set of C-springs of each suspension element in series relation so that the opposite ends of each suspension element corresponding to the opposite ends of the series connected sets of C-springs are relatively movable in two directions extending at right angles and lying in a common plane extending parallel to the general plane of the suspension elements and are relatively movable in a third direction extending at right angles to the general plane of the suspension element, means mounting one end of each suspension element on said supporting structure, means for mounting on the other end of each of the suspension elements a mass to be carried by the isolator, the general plane of each suspension element extending at an acute angle to said azimuth axis, the C-springs of the suspension elements providing the sole resilient supporting force for a mass carried by the isolator.

2. A vibration isolator having an azimuth axis and comprising, a supporting structure having a general plane extending at right angles to said azimuth axis, a plurality of suspension elements spaced angularly about said azimuth axis and each comprising a first set of parallel spaced apart C-springs, and a second set of parallel spaced apart C-springs longitudinally extending at right angles to said first set and lying in a plane extending parallel to the general plane of said first set of C-springs, means connecting said first and second set of C-springs in series relation, means mounting the suspension elements on the supporting structure with the general plane of the suspension elements extending angularly of the general plane of said supporting structure and with one end of each series connected sets of C-springs connected to the supporting structure, means for connecting the other end of each series connected sets of C-springs to a mass to be carried by the isolator, each of said C-springs including a plurality of C-spring members each having a resiliently deformable web portion, the C-spring members of each C-spring being in nested relation with at least the web portions thereof being in spaced relation, the C-springs of the suspension elements providing the sole resilient supporting force for a mass carried by the isolator.

3. A vibration isolator having an azimuth axis and comprising, a supporting structure having a general plane extending at right angles to said azimuth axis, a plurality of suspension elements spaced angularly about said azimuth axis and each having a general plane extending angularly of the general plane of said supporting structure, each suspension element comprising a first set of parallel spaced apart C-springs and a second set of parallel C-springs longitudinally extending at right angles to said first set and lying in a general plane extending parallel to the general plane of said first set of C-springs, each C-spring including a plurality of C-spring members each having a resiliently deformable web portion, the C-spring members of each C-spring being in nesting relation with the web portion thereof being in spaced relation, means connecting the C-springs of said first set in series relation to the C-springs of said second set in each said suspension element, means mounting the suspension elements on said supporting structure with one end of each series connected set of C-springs being fixed to the supporting structure, means for connecting the other of the series connected C-springs to a mass supported by the isolator, the C-springs of the suspension elements providing the sole resilient supporting force for a mass supported by the isolator, a plurality of dampers spaced angularly about said azimuth axis, each of said dampers having significant friction during operation thereof and comprising a pair of relatively movable operable portions, and means for mounting one of said operable portions on the supporting structure and connecting the other of said operable portions to a mass carried by the isolator with the lines of action on the dampers being focussed substantially at the elastic center of the isolator.

4. A vibration isolator having an azimuth axis and comprising, a supporting structure, a plurality of suspension elements angularly spaced about said azimuth axis and each comprising a first set of parallel spaced apart C-springs and a second set of parallel spaced apart C-springs longitudinally extending at right angles to said first set and lying in a general plane extending parallel to the general plane of said first set of C-springs, each C-spring including a plurality of C-spring members having a resiliently deformable web portion, the C-spring of each C-spring member being in nested relation with the web portions thereof being in spaced relation, means connecting the first and second sets of C-springs of each suspension element in series relation, means mounting the free ends of the first sets of C-springs on the base with the general plane of the C-springs extending at acute angles to said azimuth axis, means for mounting a mass on the free end of the second sets of C-springs, the C-springs of the suspension elements providing the sole resilient supporting force of a mass carried by the isolator and providing the vibratory isolation for the mass, a plurality of thrust type friction dampers each having a housing and a reciprocable member, said dampers being spaced angularly about said azimuth axis, and means mounting one of the housing and reciprocable member of each damper on the supporting structure with the lines of action of the reciprocable members being directed substantially at the elastic center of the isolator.

5. A vibration isolator having an azimuth axis and comprising, a supporting structure, a plurality of suspension elements spaced angularly about said azimuth axis, each of said suspension elements comprising a first set of parallel spaced apart C-springs and a second set of parallel spaced apart C-springs longitudinally extending at right angles to said first set and in a general plane extending parallel to the general plane of said first set, means connecting said first and second sets of C-springs of each suspension element in series relation whereby the opposite ends of each suspension element corresponding to the opposite ends of the series connected sets of C-springs are relatively movable in each of two directions extending at right angles to each other and parallel to the general plane of the sets of C-springs and in a third direcion extending at right angles to the general plane of the sets of C-springs, means mounting one end of each suspension element on the supporting structure with the general plane of each suspension element extending parallel to said azimuth axis, means for mounting a mass supported on the isolator on the other end of each of the suspension elements, the C-springs of the suspension elements providing the sole resilient supporting force for a mass carried by the isolator and providing the vibratory isolation of the mass.

References Cited in the file of this patent

UNITED STATES PATENTS

| 2,591,769 | Beechler | Apr. 8, 1952 |
| 2,647,591 | Young | Aug. 4, 1953 |
| 2,685,425 | Wallerstein | Aug. 3, 1954 |
| 2,809,724 | Wallerstein | Oct. 15, 1957 |
| 2,904,302 | Cavanaugh | Sept. 15, 1959 |
| 2,924,420 | Fink | Feb. 9, 1960 |

FOREIGN PATENTS

| 546,004 | Great Britain | June 23, 1942 |
| 764,050 | France | Feb. 26, 1934 |
| 1,185,228 | France | Feb. 9, 1959 |
| 618,043 | Germany | Aug. 31, 1935 |